United States Patent
Harada et al.

(10) Patent No.: US 12,409,502 B2
(45) Date of Patent: Sep. 9, 2025

(54) CUBIC BORON NITRIDE SINTERED MATERIAL TOOL

(71) Applicant: SUMITOMO ELECTRIC HARDMETAL CORP., Hyogo (JP)

(72) Inventors: Takashi Harada, Hyogo (JP); Satoru Kukino, Hyogo (JP); Naoki Watanobe, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 504 days.

(21) Appl. No.: 17/799,846

(22) PCT Filed: Aug. 24, 2021

(86) PCT No.: PCT/JP2021/030916
§ 371 (c)(1),
(2) Date: Aug. 15, 2022

(87) PCT Pub. No.: WO2022/070677
PCT Pub. Date: Apr. 7, 2022

(65) Prior Publication Data
US 2023/0219149 A1    Jul. 13, 2023

(30) Foreign Application Priority Data

Oct. 2, 2020 (WO) .................. PCT/JP2020/037533

(51) Int. Cl.
*B23C 5/00* (2006.01)
(52) U.S. Cl.
CPC .......... *B23C 5/00* (2013.01); *B23C 2226/125* (2013.01); *B23C 2228/49* (2013.01)
(58) Field of Classification Search
None
See application file for complete search history.

(56) References Cited

U.S. PATENT DOCUMENTS

| 2012/0213601 A1 | 8/2012 | Setoyama et al. |
| 2018/0029942 A1 | 2/2018 | Ishida et al. |

(Continued)

FOREIGN PATENT DOCUMENTS

| JP | 2006-281386 A | 10/2006 |
| JP | 2016-145131 A | 8/2016 |

(Continued)

OTHER PUBLICATIONS

Breidenstein, B. et al., Influence of Hexagonal Phase Transformation in Laser Prepared PCBN Cutting Tools on Tool Wear in Machining of INCONEL 718, Metal Powder Report, vol. 74, Issue 5, Jan. 11, 2019, pp. 237-243.

(Continued)

*Primary Examiner* — Seth Dumbris
(74) *Attorney, Agent, or Firm* — Renner, Otto, Boisselle & Sklar, LLP (57) ABSTRACT

A cubic boron nitride sintered material tool contains a plurality of cBN grains. cBN grains located on a surface of the cutting edge contain a cubic boron nitride phase, and a hexagonal boron nitride phase. When a ratio $I_{\pi^*}/I_{\sigma^*}$ between an intensity of a $\pi^*$ peak derived from a $\pi$ bond of hBN in the hexagonal boron nitride phase and an intensity of a $\sigma^*$ peak derived from a $\sigma$ bond of hBN in the hexagonal boron nitride phase and a $\sigma$ bond of cBN in the cubic boron nitride phase is determined by measuring an energy loss associated with excitation of K-shell electrons of boron, the ratio $I_{\pi^*}/I_{\sigma^*}$ of the cBN grain on the surface of the cutting edge is 0.1 to 2, and the ratio $I_{\pi^*}/I_{\sigma^*}$ of the cBN grain at a depth position of 5 μm from the surface of the cutting edge is 0.001 to 0.1.

8 Claims, 2 Drawing Sheets

(56) References Cited

U.S. PATENT DOCUMENTS

2020/0078868 A1* 3/2020 Hirano .................. C23C 28/04
2021/0268589 A1 9/2021 Hirano et al.

FOREIGN PATENT DOCUMENTS

WO 2012/032966 A1 3/2012
WO 2017/094628 A1 6/2017
WO 2020/009117 A1 1/2020

OTHER PUBLICATIONS

Christian, D. et al., Picosecond Laser Processing of Polycrystalline Cubic Boron Nitride—A Method to Examine the Ablation Behavior of a High Cubic Boron Nitride Content Grade Material, Journal of Laser Applications Feb. 1, 2016, pp. 012001-1-012001-6.
Pacella, M. et al., Enhanced Wear Performance of Laser Machined Tools in Dry Turning of Hardened Steels, Journal of Manufacturing Processes, vol. 56, Part A, May 12, 2020, pp. 189-196.

* cited by examiner

CUBIC BORON NITRIDE SINTERED MATERIAL TOOL

The present disclosure relates to a cubic boron nitride sintered material tool. The present application claims the benefit of priority based on the international patent application PCT/JP2020/037533, filed on Oct. 2, 2020. The entire contents of the international patent application are incorporated herein by reference.

TECHNICAL FIELD

Background Art

Cubic boron nitride (hereinafter also referred to as "cBN") has both hardness second only to diamond and excellent thermal conductivity. cBN further has a characteristic of low affinity with iron. Based on these physical properties, a cBN sintered material obtained by mixing cBN and a binding material to obtain a mixture, and sintering the mixture, and a binderless cBN sintered material obtained by directly converting from hexagonal boron nitride or the like to cBN without using a catalyst, and simultaneously sintering the cBN (hereinafter both together also referred to as the "cBN-based sintered material") are used as a substrate of a cutting tool, an anti-wear tool and the like. As an example of such a cBN-based sintered material, for example, Japanese Patent Laying-Open No. 2016-145131 (PTL 1) discloses polycrystalline cubic boron nitride characterized by toughness.

CITATION LIST

Patent Literature

PTL 1: Japanese Patent Laying-Open No. 2016-145131

SUMMARY OF INVENTION

A cubic boron nitride sintered material tool according to the present disclosure contains a first sintered material at least on a cutting edge. The first sintered material contains a plurality of cubic boron nitride grains. At least some cubic boron nitride grains out of the plurality of cubic boron nitride grains are located on a surface of the cutting edge. The cubic boron nitride grains located on the surface of the cutting edge contain a cubic boron nitride phase composed of a cubic boron nitride crystal structure, and a hexagonal boron nitride phase composed of a hexagonal boron nitride crystal structure. When a ratio $I_{\pi*}/I_{\sigma*}$ between an intensity of a $\pi*$ peak derived from a $\pi$ bond of hexagonal boron nitride in the hexagonal boron nitride phase and an intensity of a $\sigma*$ peak derived from a $\sigma$ bond of the hexagonal boron nitride in the hexagonal boron nitride phase and a $\sigma$ bond of the cubic boron nitride in the cubic boron nitride phase is determined for the cubic boron nitride grain located on the surface of the cutting edge by measuring an energy loss associated with excitation of K-shell electrons of boron by electron energy loss spectroscopy using a transmission electron microscope, the ratio $I_{\pi*}/I_{\sigma*}$ of the cubic boron nitride grain on the surface of the cutting edge is 0.1 to 2, and the ratio $I_{\pi*}/I_{\sigma*}$ of the cubic boron nitride grain at a depth position of 5 μm in a normal direction to the surface of the cutting edge from the surface of the cutting edge is 0.001 to 0.1.

DETAILED DESCRIPTION

Problem to be Solved by the Present Disclosure

In order to use a cBN-based sintered material as a substrate of a cutting tool, an anti-wear tool or the like, a bulk-shaped cBN-based sintered material is conventionally formed into a tool shape with a cutting edge shape finished by means of a laser. The surface of the cBN-based sintered material is, however, heated to a very high temperature through laser processing, and hence a large amount of cBN present on the surface may be transformed to hexagonal boron nitride (hereinafter also referred to as "hBN"). In this case, in a cutting tool having, on the cutting edge, a cBN-based sintered material containing the large amount of transformed hBN, since hBN is softer than cBN, the strength of the cutting edge is deteriorated to occasionally cause a defect or a chip, and hence the tool lifetime tends to be reduced. On the other hand, a tool not containing hBN on the surface of the cutting edge can be formed by, for example, grinding a bulk-shaped cBN-based sintered material with grindstone. In this case, however, since the surface of the cutting edge consists of cBN, reaction wear proceeds at the time of cutting to easily cause crater wear, a chip and a defect frequently occur, and hence the tool lifetime tends to be reduced. Accordingly, a cubic boron nitride sintered material tool using a cBN-based sintered material as a substrate has not been provided with sufficient defect resistance, and such a tool is desired to be developed.

In view of the above situation, it is an object of the present disclosure to provide a cubic boron nitride sintered material tool having improved defect resistance.

Advantageous Effect of the Present Disclosure

According to the present disclosure, a cubic boron nitride sintered material tool having improved defect resistance can be provided.

Description of Embodiments

As a result of diligent investigation into solving the above-mentioned problem, the present inventors arrived at the present disclosure. Specifically, in the step of forming a tool shape from a bulk-shaped cBN-based sintered material using a laser and finishing the cutting edge shape, the present inventors focused on producing, on the surface of the cutting edge, a moderate amount of hBN that does not adversely affect the strength of the cutting edge. In this case, the present inventors discovered that the hBN on the surface of the cutting edge plays a lubricant-like role based on its softness, thereby improving the sliding properties of the tool and thus improving defect resistance, resulting in accomplishing the present disclosure.

Firstly, embodiments of the present disclosure will be described.

[1] A cubic boron nitride sintered material tool contains a first sintered material at least on a cutting edge. The first sintered material contains a plurality of cubic boron nitride grains. At least some cubic boron nitride grains out of the plurality of cubic boron nitride grains are located on a surface of the cutting edge. The cubic boron nitride grains located on the surface of the cutting edge contain a cubic boron nitride phase composed of a cubic boron nitride crystal structure, and a hexagonal boron nitride phase composed of a hexagonal boron nitride crystal structure. When a ratio $I_{\pi*}/I_{\sigma*}$ between an intensity of a $\pi*$ peak derived from a $\pi$ bond of hexagonal boron nitride in the hexagonal boron nitride phase and an intensity of a $\sigma*$ peak derived from a $\sigma$ bond of hexagonal boron nitride in the hexagonal boron nitride phase and a $\sigma$ bond of cubic boron nitride in the cubic boron nitride phase is determined for the cubic boron nitride grain located on the surface of the cutting edge by measuring an energy loss associated with excitation of K-shell electrons of boron by electron energy loss spectroscopy using a transmission electron microscope, the ratio $I_{\pi*}/I_{\sigma*}$ of the cubic boron nitride grain on the surface of the cutting edge is 0.1 to 2, and the ratio $I_{\pi*}/I_{\sigma*}$ of the cubic boron nitride grain at a depth position of 5 μm in a normal direction to the surface of the cutting edge from the surface of the cutting edge is 0.001 to 0.1. A cubic boron nitride sintered material tool having such characteristics can have improved defect resistance.

[2] The ratio $I_{\pi*}/I_{\sigma*}$ of the cubic boron nitride grain at a depth position of 1 μm in the normal direction to the surface of the cutting edge from the surface of the cutting edge is preferably 0.001 to 0.1. As a result, the defect resistance of the cubic boron nitride sintered material tool can be further improved.

[3] The ratio $I_{\pi*}/I_{\sigma*}$ of the cubic boron nitride grain at a depth position of 0.2 μm in the normal direction to the surface of the cutting edge from the surface of the cutting edge is preferably 0.001 to 0.1. As a result, the defect resistance of the cubic boron nitride sintered material tool can be further improved.

[4] It is preferred that the cubic boron nitride sintered material tool includes a rake face, a flank face, and a ridgeline where the rake face and the flank face intersect, that the rake face is continuous with the flank face via the ridgeline, that the cutting edge of the cubic boron nitride sintered material tool is constituted from a part of the rake face, a part of the flank face, and the ridgeline, and that the surface of the cutting edge is at least a part of the surfaces of the cutting edge. As a result, the defect resistance at the cutting edge of the cubic boron nitride sintered material tool can be improved.

Details of Embodiment of Present Disclosure

Hereinafter, an embodiment of the present disclosure (hereinafter referred to as "the present embodiment") will be described in detail. In the following description, the notation in the form "A to B" means the upper limit and the lower limit of the range (that is, A or more and B or less), and when there is no description of the unit for A and the unit is described only for B, the unit of A and the unit of B are the same.

[Cubic Boron Nitride Sintered Material Tool]

The cubic boron nitride sintered material tool according to the present embodiment is a cubic boron nitride sintered material tool having the first sintered material at least on the cutting edge. The cubic boron nitride sintered material tool can improve at least defect resistance compared with this kind of conventionally known cubic boron nitride sintered material tool based on the characteristics of some cubic boron nitride grains located on the surface of the cutting edge in the first sintered material described below. For this reason, as a cutting tool, the cubic boron nitride sintered material tool according to the present embodiment is suitable for applications in, for example, drills, end mills, cutting-edge-replaceable cutting tips for drills, cutting-edge-replaceable cutting tips for end mills, cutting-edge-replaceable cutting tips for mills, cutting-edge-replaceable cutting tips for turning, metal saws, tooth cutting tools, reamers, taps, and the like. Further, the cubic boron nitride sintered material tool is also suitable for applications such as anti-wear tools such as dies, scribers, scribing wheels, dressers, and grinding tools such as grinding grindstones.

As used herein, "cutting edge" means the portion of the cutting part of the cubic boron nitride sintered material tool that is directly involved in the processing of a work material. Further, the surface of the "cutting edge" is defined as "the surface of the cutting edge". The position of the "cutting edge surface" is a position at a depth of 0 μm in the normal direction to the surface of the cutting edge from the surface of the cutting edge. As used herein, "rake face" means the face that scoops out the chips scraped from the work material at the time of cutting, and "flank face" means the face facing the face being cut of the work material at the time of cutting. It is preferred that the cubic boron nitride sintered material tool includes a rake face, a flank face, and a ridgeline where the rake face and the flank face intersect. In this case, the rake face is continuous with the flank face via the ridgeline. Further, the cutting edge of the cubic boron nitride sintered material tool is preferably constituted from a part of the rake face, a part of the flank face, and the ridgeline, and the surface of the cutting edge is preferably at least a part of the surface of the cutting edge (at least any one of a part of the surface of the rake face, a part of the surface of the flank face, and on the ridgeline). The cutting edge of the cubic boron nitride sintered material tool according to the present embodiment may be constituted of the ridgeline, a region 0.5 mm away from the ridgeline toward the rake face side, and a region 0.5 mm away from the ridgeline toward the flank face side.

Here, the shape of the cutting edge may be, for example, a sharp edge (a ridge where the rake face and the flank face intersect), a honed edge (a sharp edge processed to be rounded), a negative land (chamfered), and a shape combining a honed edge and a negative land. For this reason, when the cutting edge has a sharp edge shape, the cutting edge has a ridgeline at the interface where the rake face and flank face intersect, but in cases where the cutting edge has a honed shape or a negative land shape, the cutting edge does not have the ridgeline. However, the present specification will be described as if, even in these cases, a virtual rake face from which the rake face of the cubic boron nitride sintered material tool extends, a virtual flank face from which the flank face extends, and a virtual ridgeline where the virtual face and the virtual flank face intersect exist in the portion where the honed edge and negative land are formed.

The cubic boron nitride sintered material tool according to the present embodiment has a first sintered material at least on the cutting edge as described above. The cubic boron nitride sintered material tool preferably has an integrated structure in which the first sintered material and a base metal are combined with an adhesive layer. Any conventionally known base metal can be used as a substrate used for this type of tool. The material of this base metal is preferably, for example, any of a cemented carbide (e.g., WC-based cemented carbide, WC, as well as a material including Co or to which a carbonite of Ti, Ta, Nb or the like has been added), a cermet (having TiC, TiN, TiCN or the like as a main component), high-speed steel, and ceramics (titanium carbide, silicon carbide, silicon nitride, aluminum nitride, aluminum oxide, and the like).

Among these, it is preferred to select a cemented carbide (particularly a WC-based cemented carbide) or a cermet (especially a TiCN-based cermet) as the material of the base metal. These materials have an excellent balance between hardness and strength at high temperatures, and therefore have preferable properties for applications where cubic boron nitride sintered material tools are used. When a WC-based cemented carbide is used as the base metal, the structure may include free carbon and an irregular layer called an η phase or s phase. Further, the base metal may have a modified surface. For example, in the case of a cemented carbide, a β-free layer may be formed on the surface, and in the case of a cermet, a surface hardened layer may be formed. The base material exhibits desired effects even if its surface is modified. When the cubic boron nitride sintered material tool is a drill or an end mill, the base material is sometimes referred to as a shank, for example. In addition, when the cubic boron nitride sintered material tool is a cutting-edge-replaceable cutting tip or the like, the base material may or may not have a chip breaker. Moreover, the cubic boron nitride sintered material tool according to the present embodiment may be a mode that does not include a base material, and may have a mode composed of only a first sintered material, for example. The cubic boron nitride sintered material tool can also include a coating covering at least part of the cutting edge including the rake face, the flank face, and the ridgeline where the rake face and the flank face intersect.

Figure 1:
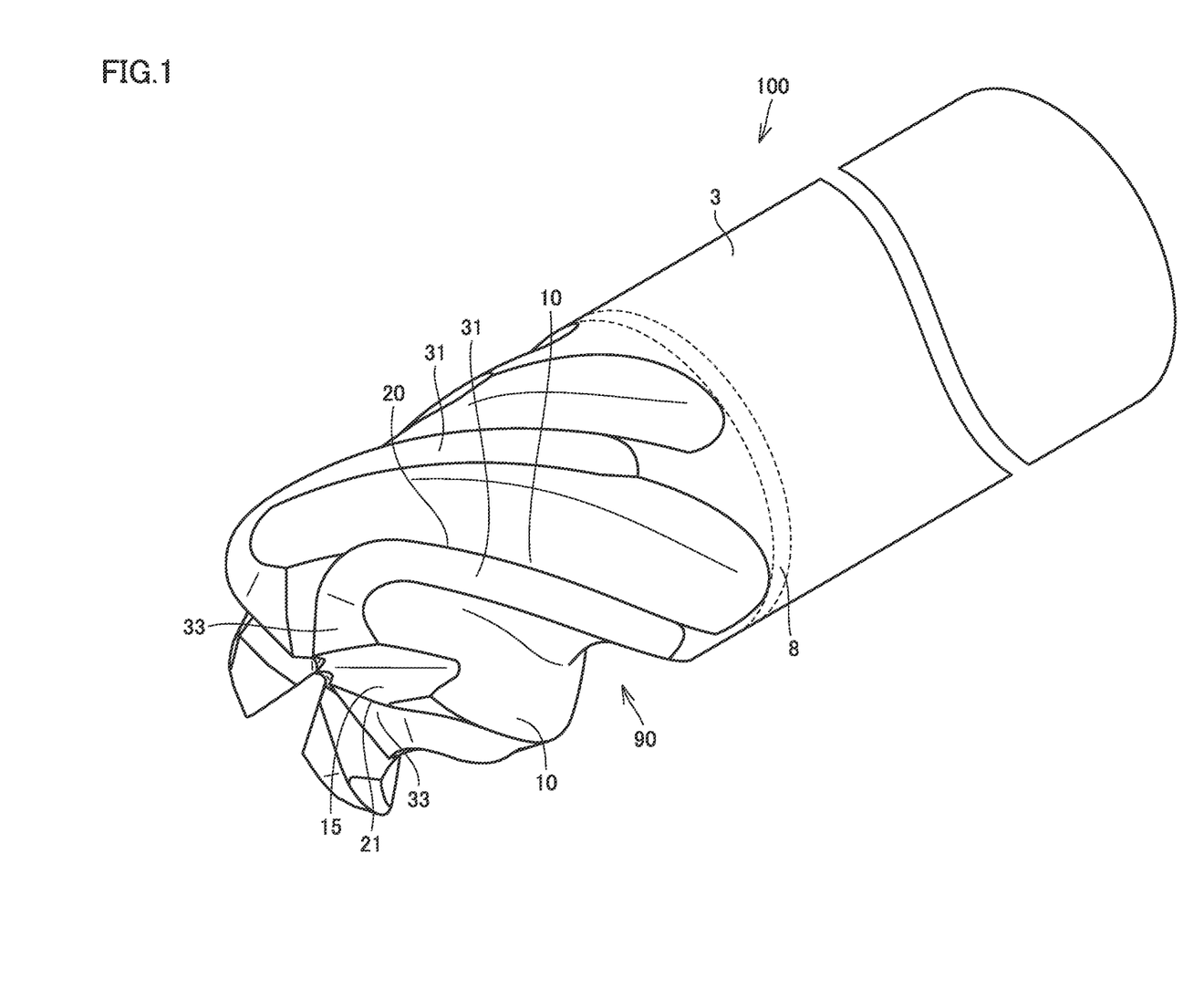
FIG. 1 is a perspective schematic diagram illustrating an example of the structure of a cubic boron nitride sintered material tool according to the present embodiment.

Here, an example of the structure of the cubic boron nitride sintered material tool will be described with reference to a drawing. FIG. 1 is a perspective schematic diagram illustrating an example of the structure of the cubic boron nitride sintered material tool according to the present embodiment. As illustrated in FIG. 1, a cubic boron nitride sintered material tool 100 according to the present embodiment is, for example, an end mill, and includes a cutting part 90, a joining part 8, and a shank part 3. Cutting part 90 has a first rake face 10, a first flank face 31, a second rake face 15, a second flank face 33, a peripheral cutting edge 20, a bottom cutting edge 21, and a front end. Shank part 3 has a rear end. Cutting part 90 is fixed on shank part 3 via joining part 8. Joining part 8 is, for example, a brazing material. First rake face 10 and second rake face 15 correspond to the rake face of the present disclosure, and first flank face 31 and second flank face 33 correspond to the flank face of the present disclosure.

First flank face 31 is continuous with first rake face 10. A ridgeline between first rake face 10 and first flank face 31 forms peripheral cutting edge 20. Second flank face 33 is continuous with second rake face 15. A ridgeline between second rake face 15 and second flank face 33 forms bottom cutting edge 21. Besides, first rake face 10 is continuous with second rake face 15. First rake face 10 is positioned behind second rake face 15 in the axial direction. First flank face 31 is continuous with second flank face 33. First flank face 31 is positioned behind second flank face 33 in the axial direction. It is noted that the end mill of FIG. 1 is only an example of the structure of the cubic boron nitride sintered material tool according to the present embodiment. The present embodiment is not limited to the end mill but encompasses, as the cutting tool, drills, cutting-edge-replaceable cutting tips for drills, cutting-edge-replaceable cutting tips for end mills, cutting-edge-replaceable cutting tips for mills, cutting-edge-replaceable cutting tips for turning, metal saws, tooth cutting tools, reamers, taps, and the like, also encompasses anti-wear tools such as dies, scribers, scribing wheels, dressers, and also encompasses grinding tools such as grinding grindstones.

<First Sintered Material>

The first sintered material contains a plurality of cubic boron nitride grains. The first sintered material specifically contains a plurality of cubic boron nitride grains (hereinafter also referred to as "cBN grains") and preferably has a similar composition to the cBN-based sintered material (the cBN sintered material or the binderless cBN sintered material) described above.

For example, the first sintered material may be a cBN sintered material (cBN-based sintered material) produced by sintering a mixture obtained by mixing a cBN grain and a binding material. In this case, the content of the cBN grain in the first sintered material is preferably 40% by volume or more and 95% by volume or less with respect to the total amount (100% by volume) of the first sintered material, and a total content of the binding material and incidental impurities is preferably 5% by volume or more and 60% by volume or less.

When the content of the cBN grain is 40% by volume or more with respect to the total amount of the first sintered material, the strength of the first sintered material is maintained at a high level based on the physical properties of the cBN grain, and therefore the defect resistance is improved. On the other hand, when the content of the cBN grain is 95% by volume or less with respect to the total amount of the first sintered material, the amount of the binding material required for the bonding between the cBN grains can be secured, and therefore an increase in flaws can be suppressed. As a result, the defect resistance improves because the occurrence of defects caused from flaws can be prevented. When the first sintered material is a cBN-based sintered material produced by sintering a mixture obtained by mixing the cBN grain and the binding material, the content of the cBN grain is preferably 50% by volume or more and 95% by volume or less with respect to the total amount of the first sintered material.

The binding material preferably contains at least either of at least one element selected from the group consisting of Group 4 elements (Ti, Zr, Hf, and the like), Group 5 elements (V, Nb, Ta, and the like), and Group 6 elements (Cr, Mo, W, and the like) in the periodic table, and Al, Co, Ni and Si, and at least one compound selected from the group consisting of nitrides, carbonitrides, borides, and oxides containing these elements, and these elements dissolved with each other in the solid state. Specifically, the binding material preferably has at least one or more compositions selected from the group consisting of Ti, Co, Cr, Ni, Al, AlN, $Al_2O_3$, $AlB_2$, TiN, TiC, TiCN, $TiB_2$, $Cr_2N$, WC, $ZrO_2$, ZrO, ZrN, $ZrB_2$, and $Si_3N_4$. In this case, the strength of the first sintered material can be improved.

Alternatively, the first sintered material may be a binderless cBN sintered material (cBN-based sintered material) produced by directly converting, under high temperature and pressure, and simultaneously sintering low pressure phase boron nitride without mixing the binding material. In this case, the content of the cBN grain in the first sintered material is substantially 100% by volume excluding incidental impurities. Here, the low pressure phase boron nitride (hereinafter also referred to as the "low pressure phase BN") refers to a boron nitride thermodynamically stable in a low pressure region, and specifically encompasses hexagonal boron nitride (hBN) similar to a hexagonal graphite structure, rhombohedral boron nitride (rBN), turbostratic boron nitride (tBN), amorphous boron nitride (aBN), and the like. Such low pressure phase BN can be prepared by reducing a compound containing boron and oxygen with a compound containing carbon and nitrogen. The first sintered material can be produced by directly converting, under high temperature and pressure of 1500 to 2100° C. and 6 to 10 GPa, and simultaneously sintering, for example, the low pressure phase BN. It is noted that the content of incidental impurities is preferably smaller, and is ideally 0% by volume, but incidental impurities may be contained in a content of several % with respect to the total amount of the first sintered material. The types and contents of elements contained as the incidental impurities can be determined, for example, by using secondary ion mass spectrometry (SIMS: Secondary Ion Mass Spectrometry).

The direct conversion to cBN is preferably performed using heated low pressure phase BN at a temperature equal to or higher than a boiling point of the compound containing boron and oxygen under non-oxidizing atmosphere. In this case, the compound containing boron and oxygen and adsorption gas volatilize by heating, and therefore, the compound containing boron and oxygen and the adsorption gas do not remain in the low pressure phase BN. As a result, bond strength among the cBN grains is increased, and a cBN-based sintered material (first sintered material) excellent not only in strength and hardness but also in heat resistance and heat dissipation can be obtained.

When the first sintered material is a cBN sintered material (cBN-based sintered material) produced by sintering a mixture obtained by mixing the cBN grain and the binding material, the contents (% by volume) of the cBN grain and the binding material in the first sintered material can be obtained by analyzing a structural photograph of the first sintered material captured by a scanning electron microscope (SEM, trade name: "JSM-7800F", manufactured by JEOL Ltd.) using commercially available image analysis software (trade name: "WinROOF", manufactured by Mitani Corporation). More specifically, first, a sample of the first sintered material is taken from the surface of the cutting edge of a cubic boron nitride sintered material tool manufactured based on the manufacturing method described later, and the surface of the sample of the first sintered material is mirror polished. Next, the reflected electron image of the mirror polished surface of the sample is observed at a magnification of 5000 to 20000 times using the SEM. Besides, an energy dispersive X-ray analyzer (EDS, trade name: "Octane Elect", manufactured by AMETEK) attached to the SEM is used to identify a black region in the reflected electron image as the cubic boron nitride, and identify a gray region and a white region as the binding material. In addition, the structural photograph of the mirror polished surface is captured using the SEM, and the image analysis software is used on the structural photograph to obtain areas respectively occupied by the cubic boron nitride (black region) and the binding material (gray region and white region) in the structural photograph, and the contents (% by volume) of the cubic boron nitride and the binding material can be obtained from the occupied areas.

The $D_{50}$ (average grain size) of the cBN grain is not particularly limited, and can be, for example, 0.5 to 10.0 µm. Usually, the smaller the $D_{50}$, the harder the cBN sintered material tends to be, and the smaller the grain size variation, the more homogeneous the properties of the cBN sintered material tend to be. The $D_{50}$ of the cBN grain is, for example, preferably 1 to 5.0 µm.

The $D_{50}$ of the cBN grain is obtained as follows. First, a sample including the cross-section of the cBN sintered material is prepared in accordance with the above-described method for measuring the content of the cBN grain, and thus the reflected electron image is obtained. Next, the image analysis software is used to calculate a circle equivalent diameter of each black region in the reflected electron image. It is preferred to calculate the circle equivalent diameters of 100 or more cBN grains by observing 5 or more visual fields.

Next, a cumulative distribution is obtained by arranging each circle equivalent diameter in ascending order from the minimum value to the maximum value. In the cumulative distribution, the grain size at 50% of the cumulative area becomes $D_{50}$. It is noted that circle equivalent diameter means the diameter of a circle having the same area as the measured cBN grain area.

(Abundance Ratio of hBN in First Sintered Material (Ratio $I_{\pi*}/I_{\sigma*}$))

The first sintered material contains a plurality of cBN grains as described above. At least some cBN grains out of the plurality of cBN grains are located on the surface of the cutting edge. The cBN grains located on the surface of the cutting edge include a cubic boron nitride phase (hereinafter also referred to as the "cBN phase") composed of a cBN crystal structure, and a hexagonal boron nitride phase (hereinafter also referred to as the "hBN phase") composed of a hBN crystal structure. When a ratio $I_{\pi*}/I_{\sigma*}$ between an intensity of a π* peak derived from a π bond of hBN in the hBN phase and an intensity of a σ* peak derived from a σ bond of hBN in the hBN phase and a σ bond of cBN in the cBN phase is determined for the cBN grain located on the surface of the cutting edge by measuring an energy loss associated with excitation of K-shell electrons of boron by electron energy loss spectroscopy using a transmission electron microscope (hereinafter also referred to as "TEM-EELS"), the ratio $I_{\pi*}/I_{\sigma*}$ of the cBN grain on the surface of the cutting edge is 0.1 to 2, and the ratio $I_{\pi*}/I_{\sigma*}$ of the cBN grain at a depth position of 5 µm in a normal direction to the surface of the cutting edge from the surface of the cutting edge is 0.001 to 0.1. As a result, the defect resistance of the cubic boron nitride sintered material tool can be improved.

As described above, the cubic boron nitride sintered material tool according to the present embodiment has the ratio $I_{\pi*}/I_{\sigma*}$ of the cBN grain on the surface of the cutting edge of 0.1 to 2, and the ratio $I_{\pi*}/I_{\sigma*}$ of the cBN grain at the depth position of 5 µm in the normal direction to the surface of the cutting edge from the surface of the cutting edge of 0.001 to 0.1. As a result, the cubic boron nitride sintered material tool can have hBN in a moderate ratio that does not adversely affect the strength of the tool at the cutting edge. In this case, the hBN on the surface of the cutting edge plays a lubricant-like role based on its softness, thereby improving the sliding properties of the tool and thus improving the defect resistance. In particular, it is preferred that the ratio $I_{\pi*}/I_{\sigma*}$ of the cBN grain at a depth position of 1 µm in the normal direction to the surface of the cutting edge from the surface of the cutting edge is 0.001 to 0.1, and that the ratio $I_{\pi*}/I_{\sigma*}$ of the cBN grain at a depth position of 0.2 µm in the normal direction to the surface of the cutting edge from the surface of the cutting edge is 0.001 to 0.1. In this case, the defect resistance of the cubic boron nitride sintered material tool can be further improved.

Figure 2:
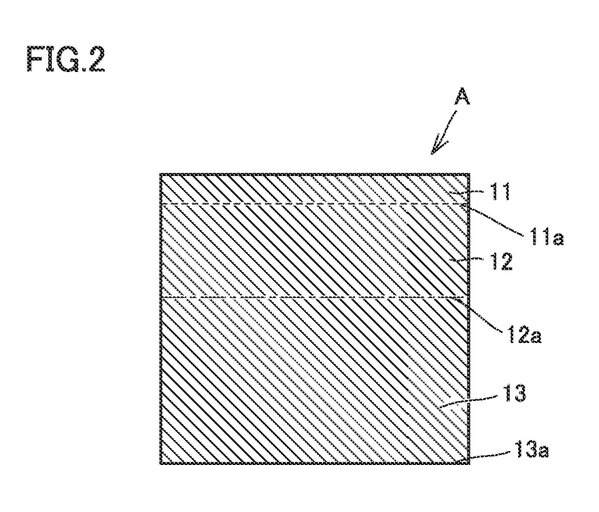
FIG. 2 is an explanatory view illustrating a part of a cross-section obtained by cutting a cubic boron nitride grain located on the surface of a cutting edge of the cubic boron nitride sintered material tool according to the present embodiment at a face parallel to a normal direction of the surface of the cutting edge.

Here, with reference to FIG. 2, the cBN grain located on the surface of the cutting edge will now be described. FIG. 2 is an explanatory diagram illustrating a part of a cross-section obtained by cutting a cubic boron nitride grain located on the surface of the cutting edge of the cubic boron nitride sintered material tool according to the present embodiment at a face parallel to the normal direction of the surface of the cutting edge. In FIG. 2, one (one grain) of some cBN grains A located on the surface of the cutting edge out of the plurality of cBN grains contained in the first sintered material in the cutting edge is focused, and is illustrated. The cBN grain A of FIG. 2 has a first region 11 and a second region 12 in that order from the surface of the cutting edge in the direction toward a cutting edge internal region 13. First region 11 is a region to a depth position 11a of 0.2 μm in the normal direction to the surface of the cutting edge from the surface of the cutting edge. Second region 12 is a region from the interface with depth position 11a to a depth position 12a of 1 μm in the normal direction to the surface of the cutting edge from the surface of the cutting edge. Cutting edge internal region 13 is a region from the interface with depth position 12a to a depth position 13a of 5 μm in the normal direction to the surface of the cutting edge from the surface of the cutting edge.

In cBN grain A, first region 11, second region 12, and cutting edge internal region 13 are integrally inseparable. As used herein, "integral inseparable" means that the crystal lattice constituting cBN grain A at the interface between first region 11 and second region 12 and at the interface between second region 12 and cutting edge internal region 13 is continuous, and that the crystal lattice at the interface between first region 11 and second region 12 and at the interface between second region 12 and cutting edge internal region 13 is not cleaved open. That is, as used herein, the interface between first region 11 and second region 12 and the interface between second region 12 and cutting edge internal region 13 both mean interfaces that are provided, for convenience, on a cross-section of cBN grain A for measuring a ratio representing the abundance ratio of hBN at each of depth position 11a of 0.2 μm in the normal direction to the surface of the cutting edge from the surface of the cutting edge in cBN grain A, depth position 12a of 1 μm in the normal direction to the surface of the cutting edge from the surface of the cutting edge in cBN grain A, and depth position 13a of 5 μm in the normal direction to the surface of the cutting edge from the surface of the cutting edge in cBN grain A. Hereinafter, a method for measuring the ratio $I_{\pi*}/I_{o*}$ representing the abundance ratio of hBN using TEM-EELS will be described.

(Method for Measuring hBN Abundance Ratio (Ratio $I_{\pi*}/I_{o*}$) Using TEM-EELS)

First, a cubic boron nitride sintered material tool is manufactured based on the manufacturing method described later. Next, a sample of a first sintered material is taken from the surface of the cutting edge of the cubic boron nitride sintered material tool, and the sample is cut at a face parallel to the normal direction to the surface of the cutting edge using an argon ion slicer to produce a section having a thickness of 3 to 100 nm. Further, a cross-sectional transmission image of cBN grain A located on the surface of the cutting edge in the sample is obtained by observing the section at a magnification of 100,000 to 1 million times using a transmission electron microscope (TEM, trade name: "JEM-2100F/Cs", manufactured by JEOL Ltd.).

Next, in the cross-sectional transmission image, the surface position of the cutting edge in cBN grain A, depth position 11a of 0.2 μm in the normal direction to the surface of the cutting edge from the surface of the cutting edge in cBN grain A, depth position 12a of 1 μm in the normal direction to the surface of the cutting edge from the surface of the cutting edge in cBN grain A, and depth position 13a of 5 μm in the normal direction to the surface of the cutting edge from the surface of the cutting edge in cBN grain A are each identified. Further, using electron energy loss spectroscopy (EELS), at the surface position of the cutting edge, depth position 11a of 0.2 μm in the normal direction to the surface of the cutting edge from the surface of the cutting edge, depth position 12a of 1 μm in the normal direction to the surface of the cutting edge from the surface of the cutting edge, and depth position 13a of 5 μm in the normal direction to the surface of the cutting edge from the surface of the cutting edge in cBN grain A, the energy loss (K edge) associated with the excitation of boron K-shell electrons is observed by scanning 1 nm observation spots over 10 nm in the direction parallel to the cutting edge surface, for example. As a result, an energy loss (K edge) curve around 200 eV associated with the excitation of the boron K-shell electrons can be drawn for each of the surface position of the cutting edge, depth position 11a of 0.2 μm in the normal direction to the surface of the cutting edge from the surface of the cutting edge, depth position 12a of 1 μm in the normal direction to the surface of the cutting edge from the surface of the cutting edge, and depth position 13a of 5 μm in the normal direction to the surface of the cutting edge from the surface of the cutting edge in cBN grain A.

Finally, from the energy loss curve drawn based on the observation at the surface position of the cutting edge in cBN grain A, the intensity of a π* peak ($I_{\pi*}$) derived from the π bond of hBN in the hBN phase, the intensity of a σ* peak ($I_{o*}$) derived from the σ bond of hBN in the hBN phase and the σ bond of cBN in the cBN phase are obtained, and then, the ratio $I_{\pi*}/I_{o*}$ can be obtained by dividing $I_{\pi*}$ by $I_{o*}$. The ratio $I_{\pi*}/I_{o*}$ can also be obtained in the same way from the energy loss curve drawn based on the observation at depth position 11a of 0.2 μm in the normal direction to the surface of the cutting edge from the surface of the cutting edge, the energy loss curve drawn based on the observation at depth position 12a of 1 μm in the normal direction to the surface of the cutting edge from the surface of the cutting edge, and the energy loss curve drawn based on the observation at depth position 13a of 5 μm in the normal direction to the surface of the cutting edge from the surface of the cutting edge.

In this case, the cubic boron nitride sintered material tool according to the present embodiment has a ratio $I_{\pi*}/I_{o*}$ of cBN grain A at the surface of the cutting edge of 0.1 to 2, and a ratio $I_{\pi*}/I_{o*}$ of cBN grain A at the depth position of 5 μm in the normal direction to the surface of the cutting edge from the surface of the cutting edge of 0.001 to 0.1. Besides, it is preferred that a ratio $I_{\pi*}/I_{o*}$ of cBN grain A at the depth position of 1 μm in the normal direction to the surface of the cutting edge from the surface of the cutting edge is 0.001 to 0.1, and that a ratio $I_{\pi*}/I_{o*}$ of cBN grain A at the depth position of 0.2 μm in the normal direction to the surface of the cutting edge from the surface of the cutting edge is 0.001 to 0.1.

It is more preferred that the cubic boron nitride sintered material tool according to the present embodiment has a ratio $I_{\pi*}/I_{o*}$ of cBN grain A at the surface of the cutting edge of 0.6 to 1, and a ratio $I_{\pi*}/I_{o*}$ of cBN grain A at the depth position of 5 μm in the normal direction to the surface of the cutting edge from the surface of the cutting edge of 0.005 to 0.01. It is also preferred that the ratio $I_{\pi*}/I_{o*}$ of cBN grain A at the depth position of 1 μm in the normal direction to the surface of the cutting edge from the surface of the cutting edge is 0.001 to 0.2, and that the ratio $I_{\pi*}/I_{o*}$ of cBN grain A at the depth position of 0.2 μm in the normal direction to the surface of the cutting edge from the surface of the cutting edge is 0.001 to 0.9. It is further preferred that the ratio $I_{\pi*}/I_{o*}$ of cBN grain A at the depth position of 1 μm in the normal direction to the surface of the cutting edge from the surface of the cutting edge is 0.005 to 0.01, and that the ratio $I_{\pi*}/I_{o*}$ of cBN grain A at the depth position of 0.2 μm in the normal direction to the surface of the cutting edge from the surface of the cutting edge is 0.005 to 0.01.

In the measurement method described above, one cross-sectional transmission photograph of the cBN grain located on the surface of the cutting edge is prepared for each of the rake face side and the flank face side of the cutting edge (two photographs in total). When the ratio $I_{\pi*}/I_{o*}$ of the cBN grain on the surface of the cutting edge and the ratio $I_{\pi*}/I_{o*}$ of the cBN grain at the depth position of 5 μm in the normal direction to the surface of the cutting edge from the surface of the cutting edge are determined based on these two cross-sectional transmissive photographs of the cBN grain, the cubic boron nitride sintered material tool to be measured can have improved defect resistance by satisfying those ratios in at least one of the cross-sectional transmission photographs. The ratio $I_{\pi*}/I_{o*}$ means the ratio between the peak value of a π* peak and the peak value of a σ* peak. Further, the π* peak and σ* peak can be obtained by adding the results of, for example, scanning 1 nm observation spots over 10 nm in the direction parallel to the cutting edge surface, at measurement locations at the surface position of the cutting edge, the depth position of 5 μm in the normal direction to the surface of the cutting edge from the surface of the cutting edge, and the like, and drawing the calculated addition result as an energy loss curve. Here, the length of the scan of 10 nm can be freely changed between 1 and 100 nm.

The cubic boron nitride sintered material tool according to the present embodiment may have, at the depth position of 5 μm from the surface of the cutting edge, in the normal direction to the surface of the cutting edge, or the depth position of 1 μm from the surface of the cutting edge, in the normal direction to the surface of the cutting edge, another cBN grain different from the cBN grain located on the surface of the cutting edge. However, even in this case, as long as the ratio $I_{\pi*}/I_{o*}$ representing the abundance ratio of hBN is measured, it is considered that the ratio $I_{\pi*}/I_{o*}$ at those depth positions is determined by applying the above-described TEM-EELS presuming that the another cBN grain is a cBN grain located on the surface of the cutting edge.

<Effects>

The cubic boron nitride sintered material tool according to the present embodiment has, as described above, a ratio $I_{\pi*}/I_{o*}$ of the cBN grain on the surface of the cutting edge of 0.1 to 2 and a ratio $I_{\pi*}/I_{o*}$ of the cBN grain at a depth position of 5 μm in the normal direction to the surface of the cutting edge from the surface of the cutting edge of 0.001 to 0.1. As a result, the cBN grain located on the surface of the cutting edge can have a moderate ratio of hBN that does not adversely affect the strength of the cutting edge. In this case, the hBN on the surface of the cutting edge plays a lubricant-like role based on its softness, thereby improving the sliding properties of the tool and thus improving the defect resistance. In particular, it is preferred that the cubic boron nitride sintered material tool according to the present embodiment preferably has a ratio $I_{\pi*}/I_{o*}$ of the cBN grain at the depth position of 1 μm in the normal direction to the surface of the cutting edge from the surface of the cutting edge of 0.001 to 0.1, and a ratio $I_{\pi*}/I_{o*}$ of the cBN grain at the depth position of 0.2 μm in the normal direction to the surface of the cutting edge from the surface of the cutting edge of 0.001 to 0.1. In this case, the defect resistance can be further improved.

[Method for Manufacturing Cubic Boron Nitride Sintered Material Tool]

The cubic boron nitride sintered material tool according to the present embodiment can be manufactured by performing a conventionally known method for manufacturing a cubic boron nitride sintered material tool, except for the step of finishing the cutting edge described later performed on the cutting edge. For example, it is preferred to manufacture the cubic boron nitride sintered material tool according to the present embodiment by using the following manufacturing method. In the following, a method for manufacturing the cubic boron nitride sintered material tool according to the present embodiment in which a mixture is obtained by mixing a cBN grain and a binding material, and a cBN sintered material (cBN-based sintered material) obtained by sintering the mixture is used as a material will be exemplarily described, but the manufacturing method is not limited to this method. For example, the cubic boron nitride sintered material tool according to the present embodiment may be manufactured by using a binderless cBN sintered material (cBN-based sintered material) as a material. In this case, the cubic boron nitride sintered material tool according to the present embodiment can be manufactured by performing, in addition to a conventionally known manufacturing method using a binderless cBN sintered material as a material, a step similar to the step of finishing the cutting edge described later on a cutting edge containing the binderless cBN sintered material.

The method for manufacturing the cubic boron nitride sintered material tool according to the present embodiment preferably includes at least a step of preparing a cBN-based sintered material (first step), a step of cutting the cBN-based sintered material into a predetermined tool shape (second step), a step of joining the sintered material cut into the tool shape with a base material by brazing (third step), and a step of finishing the cutting edge by performing laser processing on the cutting edge of the sintered material joined with the base material (fourth step). When the cubic boron nitride sintered material tool is a mode composed of only a cBN-based sintered material, it is not necessary to perform the third step because a base material is not used, and the step of finishing the cutting edge (fourth step) may be performed on the cutting edge of the sintered material cut into the predetermined tool shape in the second step.

<First Step>

The first step is a step of preparing a cBN-based sintered material. The first step can be performed by a conventionally known method. For example, first, 15 to 90% by volume of a powder of cubic boron nitride grains having an average grain size of 1 to 5 and 10 to 85% by volume of a powder containing at least one element selected from the group consisting of Ti, Zr, Hf, V, Nb, Ta, Cr, Mo, W, Al, Co, Ni, and Si having an average grain size of 0.05 to 8 or a compound of any of these elements and at least one element selected from the group consisting of C, N, O and B are compounded (noted that a total amount is 100% by volume) to obtain a raw material powder. Next, the raw material powder is mixed using a cemented carbide ball or the like with a wet ball mill for 5 to 24 hours to prepare a mixture. The mixture is molded into a predetermined shape to obtain a molded article. Finally, the molded article is put in a known ultra-high pressure generator, and held under pressure of 4 to 7 GPa at a sintering temperature of 1300 to 1500° C. for a predetermined time period. As a result, a cBN-based sintered material can be prepared.

<Second Step>

The second step is a step of cutting the cBN-based sintered material into a predetermined tool shape. The second step can also be performed by a conventionally known method. For example, the cBN-based sintered material can be cut into the predetermined tool shape by at least one of electric discharge machining using a conventionally known electric discharge machining machine, grinding using a grinding machine, or laser processing using a laser processing machine. In other words, it is deemed that the second step is a step of cutting the cBN-based sintered material into the predetermined tool shape by rough processing and precision processing using predetermined means.

<Third Step>

The third step is a step of joining the sintered material cut into the tool shape with the base material by brazing. The third step can also be performed by a conventionally known method. Specifically, the base material is joined by brazing to the end face on the opposite side to that where the cutting edge in the sintered material cut into the tool shape is formed. As the brazing, for example, brazing using silver wax is preferable. As a result, in the next step (fourth step), it is convenient to irradiate the laser toward the cutting edge of the sintered material, and it is easy to subject the cutting edge of the sintered material to finishing.

<Fourth Step>

The fourth step is a step of finishing the cutting edge by performing laser processing on the cutting edge of the sintered material joined to the base material. As a result of the fourth step, an hBN phase having the above-described characteristics can be formed in the cBN grain located on the surface of the cutting edge. In the fourth step, the conditions for the laser processing and the like should not be particularly limited as long as the hBN phase having the above-described characteristics can be formed in the cBN grain located on the surface of the cutting edge, and when the laser processing is performed, for example, under conditions described below, the hBN phase having the above-described characteristics can be formed in high yield in the cBN grain located on the surface of the cutting edge.

For example, in the fourth step, using a picosecond laser, it is preferred to finish the cutting edge of the sintered material under laser irradiation conditions of a laser wavelength of 532 nm or more and 1064 nm or less, a laser spot diameter of 5 μm or more and 70 μm or less as a half-width, a laser focal depth of 0.5 mm or more and 20 mm or less, a laser output of 1 W or more and 20 W or less at the processing point, and a laser scanning speed of 5 mm/s or more and 100 mm/s or less. In this case, it is preferred to cool the workpiece by spraying compressed air to avoid excessive heating occurring on the surface of the cutting edge. For example, when compressed air is sprayed on the workpiece using a vortex tube (manufactured by Kogi Corporation), cool air having a temperature lower than room temperature is obtained by the vortex effect, and cooling can be performed more effectively. As a result, the transformation from cBN to hBN in a region in the vicinity of the surface of the cutting edge (for example, within 1 μm, and preferably within 0.2 μm from the surface) can be controlled to a moderate amount that does not adversely affect the strength of the cutting edge. The cooling conditions used in combination with the laser processing can be set by appropriately adjusting the operating conditions of the vortex tube.

In addition, as the laser irradiation conditions, it is preferred to specify, as necessary, a laser pulse width of 1 f (femto) seconds or more and 1μ seconds or less and a laser repetition frequency of 10 Hz or more and 1 MHz or less.

Under these laser irradiation conditions, when the laser spot diameter is less than 5 μm as the half-width, the laser power is low, and therefore finishing of the cutting edge tends to be difficult. When the laser spot diameter exceeds 70 μm as the half-width, the cBN-based sintered material tends to crack because the laser power is high. When the laser focal depth is less than 0.5 mm, finishing of the cutting edge tends to be difficult due to defocusing. When the laser output is less than 1 W at the processing point, finishing of the cutting edge tends to be difficult because the laser power is low. When the laser output exceeds 20 W at the processing point, the cBN-based sintered material tends to crack due to the high laser power.

When the laser scanning speed is less than 5 mm/s, the cBN-based sintered material tends to crack due to the laser penetrating too deep inside the cutting edge. When the laser scanning speed exceeds 100 mm/s, laser processing tends to not to be performed much. When the laser pulse width is less than 1 f second, the processing with the laser tends to take too long, and the laser apparatus tends to be extremely expensive. When the laser pulse width exceeds 1 μsec, thermal processing becomes dominant, and transformation from cBN to hBN tends to be excessive. When the laser repetition frequency is less than 10 Hz, thermal processing becomes dominant, and transformation from cBN to hBN tends to be excessive. When the laser repetition frequency exceeds 1 MHz, the next laser pulse arrives before the energy of the irradiated laser pulse is consumed at the processing point, so that the thermal load at the processing point increases and transformation from cBN to hBN tends to be excessive.

<Other Steps>

The cubic boron nitride sintered material tool according to the present embodiment may include a coating covering at least a portion of the rake face, flank face, and ridgeline where the rake face and the flank face intersect. In this case, as a method for manufacturing the cubic boron nitride sintered material tool according to the present embodiment, it is preferred to include a step of covering the cubic boron nitride sintered material tool with a coating. This step can use a conventionally known method. Examples thereof include physical vapor deposition methods such as ion plating, arc ion plating, sputtering, and ion mixing. Further, it is also possible to coat the cubic boron nitride sintered material tool with a coating by a chemical vapor deposition method.

<Effects>

Based on the above, a cubic boron nitride sintered material tool according to the present embodiment can be manufactured. In the cubic boron nitride sintered material tool, the transformation from cBN to hBN on the surface of the cutting edge is suppressed at the time of the finishing of the cutting edge. Therefore, when a ratio between an intensity of a π* peak derived from a π bond of hBN in the hBN phase and an intensity of a σ* peak derived from a σ bond of hBN in the hBN phase and a σ bond of cBN in the cBN phase is determined for the cBN grain located on the surface of the cutting edge by measuring an energy loss associated with excitation of K-shell electrons of boron by TEM-EELS, the ratio $I_{\pi^*}/I_{\sigma^*}$ of the cBN grain on the surface of the cutting edge is 0.1 to 2, and the ratio $I_{\pi*}/I_{\sigma*}$ of the cBN grain at a depth position of 5 μm in the normal direction to the surface of the cutting edge from the surface of the cutting edge is 0.001 to 0.1. As a result, a cubic boron nitride sintered material tool having improved defect resistance can be obtained by the above-described manufacturing method.

[Supplementary Notes]

The above description includes the following embodiments supplementarily added below.

<Supplementary Note 1>

A cubic boron nitride sintered material tool comprising a first sintered material at least on a cutting edge, wherein
- the first sintered material contains a plurality of cubic boron nitride grains,
- at least some cubic boron nitride grains out of the plurality of cubic boron nitride grains are located on a surface of the cutting edge,
- the cubic boron nitride grains located on the surface of the cutting edge contain a cubic boron nitride phase composed of a cubic boron nitride crystal structure, and a hexagonal boron nitride phase composed of a hexagonal boron nitride crystal structure, and
- when a ratio $I_{\pi*}/I_{\sigma*}$ between an intensity of a π* peak derived from a π bond of hexagonal boron nitride in the hexagonal boron nitride phase and an intensity of a σ* peak derived from a σ bond of hexagonal boron nitride in the hexagonal boron nitride phase and a σ bond of cubic boron nitride in the cubic boron nitride phase is determined for the cubic boron nitride grain located on the surface of the cutting edge by measuring an energy loss associated with excitation of K-shell electrons of boron by electron energy loss spectroscopy using a transmission electron microscope, the ratio $I_{\pi*}/I_{\sigma*}$ of the cubic boron nitride grain on the surface of the cutting edge is 0.1 to 2, and the ratio $I_{\pi*}/I_{\sigma*}$ of the cubic boron nitride grain at a depth position of 5 μm in a normal direction to the surface of the cutting edge from the surface of the cutting edge is 0.001 to 0.1.

<Supplementary Note 2>

The cubic boron nitride sintered material tool according to supplementary addition 1, wherein when the first sintered material is a cBN sintered material produced by sintering a mixture obtained by mixing a cubic boron nitride grain and a binding material, a content of the cubic boron nitride grain in the first sintered material is 40% by volume or more and 95% by volume or less with respect to a total amount (100% by volume) of the first sintered material.

<Supplementary Note 3>

The cubic boron nitride sintered material tool according to supplementary addition 1, wherein the first sintered material is a binderless cBN sintered material produced by directly converting, under high temperature and pressure, and simultaneously sintering low pressure phase boron nitride without mixing a binding material.

Examples

Hereinafter, the present disclosure will be described in more detail with reference to examples, but the present disclosure is not limited thereto. In the following description, Samples 1 to 9 are examples, and Sample 10 is a comparative example.

[Manufacture of Cubic Boron Nitride Sintered Material Tool]

<Sample 1>

(First Step)

A cBN grain (trade name: "SBN", manufactured by Showa Denko K.K.) having an average grain size of 1 μm was prepared. Next, a cemented carbide ball medium having a diameter (φ) of 3 mm, a TiN grain (trade name: "Titanium Nitride Powder", manufactured by Japan New Metals Co., Ltd.) having an average grain size of 1 μm, and an $Al_2O_3$ grain (trade name: "High Purity Alumina", manufactured by Sumitomo Chemical Co., Ltd.) having an average grain size of 200 nm were put in a cemented carbide vessel together with ethanol, and the resultant was mixed and ground for 20 hours by a ball mill mixing method to obtain a raw material powder of a binding material. Further, to the raw material powder of the binding material held in the cemented carbide vessel, the cBN grain was added, and the resultant was mixed and ground for 10 hours by the ball mill mixing method to obtain a mixed powder. Subsequently, the mixed powder was filled in a molybdenum (Mo) capsule, and the resultant was sintered at a pressure of 7.0 GPa and a temperature of 1600° C. for 30 minutes using an ultra-high pressure generator to prepare a cBN-based sintered material.

(Second Step)

To manufacture the end mill specified by catalog number "BNES1120" (Sumitomo Electric Industries, Ltd.), a rectangular sintered material was cut out from the cBN-based sintered material using a commercially available wire electric discharge machining machine. The shape of the end mill included a rake face, a flank face, and a ridgeline where the rake face and the flank face intersected, and the rake face was continuous with the flank face via the ridgeline. Further, the shape of the end mill was constituted from a part of the rake face, a part of the flank face, and the cutting edge at the ridgeline. Specifically, the shape of the end mill was constituted from the ridgeline and regions 0.5 mm away from the ridgeline on each of the rake face side and the flank face side.

(Third Step)

A shank to be used as a base material was prepared by processing Igetalloy (registered trademark, grade: G10E), which is a cemented carbide manufactured by Sumitomo Electric Industries, Ltd. This shank and the sintered material cut into the rectangle were joined to each other by brazing.

(Fourth Step)

After forming a cutting edge by grinding the sintered material joined to the shank, the cutting edge was finished by performing laser processing under the following irradiation conditions on only the flank face side of the cutting edge.

<Irradiation Conditions>

Laser wavelength: 1064 nm
Laser spot diameter: 40 μm (half width)
Laser focal depth: 1.5 mm
Laser output: 5 W (processing point)
Laser scanning speed: 10 mm/sec
Laser pulse width: 10 ps (picoseconds)
Laser repetition frequency: 200 kHz As a result, an end mill (cubic boron nitride sintered material tool) of Sample 1 was obtained. An end mill of Sample 1 has the first sintered material containing the cBN-based sintered material at least on the cutting edge. The first sintered material contains a plurality of cubic boron nitride grains, and at least some cubic boron nitride grains out of the plurality of cubic boron nitride grains are located on the surface of the cutting edge. In the cubic boron nitride grains located on the surface of the cutting edge, a cubic boron nitride phase composed of a cubic boron nitride crystal structure and a hexagonal boron nitride phase composed of a hexagonal boron nitride crystal structure are formed by the fourth step.

<Sample 2>

An end mill (cubic boron nitride sintered material tool) of Sample 2 was obtained by using the same method as for Sample 1, except that in the fourth step laser processing was performed on only the rake face side of the cutting edge of sintered material.

<Sample 3>

An end mill (cubic boron nitride sintered material tool) of Sample 3 was obtained by using the same method as for Sample 1, except that in the fourth step laser processing was performed on both the flank face side and the rake face side of the cutting edge of sintered material.

<Sample 4>

An end mill (cubic boron nitride sintered material tool) of Sample 4 was obtained by using the same method as for Sample 1, except that in the fourth step, when laser processing the flank face side of the cutting edge of sintered material, the workpiece was cooled by spraying compressed air using a vortex tube (manufactured by Kogi Corporation) on the flank face side of the cutting edge, and the laser output was set to 10 W.

<Sample 5>

An end mill (cubic boron nitride sintered material tool) of Sample 5 was obtained by using the same method as for Sample 2, except that in the fourth step, when laser processing the rake face side of the cutting edge of sintered material, the workpiece was cooled by spraying compressed air using a vortex tube (manufactured by Kogi Corporation) on the rake face side of the cutting edge, and the laser output was set to 10 W.

<Sample 6>

An end mill (cubic boron nitride sintered material tool) of Sample 6 was obtained by using the same method as for Sample 3, except that in the fourth step, when laser processing the flank face side and the rake face side of the cutting edge of sintered material, the workpiece was cooled by spraying compressed air using a vortex tube (manufactured by Kogi Corporation) on the flank face side and the rake face side of the cutting edge, and the laser output was set to 10 W.

<Sample 7>

An end mill (cubic boron nitride sintered material tool) of Sample 7 was obtained by using the same method as for Sample 1, except that in the fourth step, when laser processing the flank face side of the cutting edge of sintered material, the workpiece was cooled by spraying compressed air using a vortex tube (manufactured by Kogi Corporation) on the flank face side of the cutting edge, and the laser output was set to 3 W.

<Sample 8>

An end mill (cubic boron nitride sintered material tool) of Sample 8 was obtained by using the same method as for Sample 2, except that in the fourth step, when laser processing the rake face side of the cutting edge of sintered material, the workpiece was cooled by spraying compressed air using a vortex tube (manufactured by Kogi Corporation) on the rake face side of the cutting edge, and the laser output was set to 3 W.

<Sample 9>

An end mill (cubic boron nitride sintered material tool) of Sample 9 was obtained by using the same method as for Sample 3, except that in the fourth step, when laser processing the flank face side and the rake face side of the cutting edge of sintered material, the workpiece was cooled by spraying compressed air using a vortex tube (manufactured by Kogi Corporation) on the flank face side and the rake face side of the cutting edge, and the laser output was set to 3 W.

<Sample 10>

An end mill (cubic boron nitride sintered material tool) of Sample 10 was obtained by using the same method as for Sample 3, except that, instead of laser processing, in the fourth step grinding was performed using a grindstone on both the flank face side and the rake face side of the cutting edge of sintered material.

[Measurement of hBN Abundance Ratio (Ratio $I_{\pi*}/I_{o*}$)]

For each cBN grain located on the surface of the cutting edge (both flank face side and rake face side) of the end mills of Sample 1 to Sample 10, the ratio $I_{\pi*}/I_{o*}$ of the cBN grain on the surface of the cutting edge, the ratio $I_{\pi*}/I_{o*}$ of the cBN grain at a depth position of 0.2 μm in the normal direction to the surface of the cutting edge from the surface of the cutting edge, the ratio $I_{\pi*}/I_{o*}$ of the cBN grain at a depth position of 1 μm in the normal direction to the surface of the cutting edge from the surface of the cutting edge, and the ratio $I_{\pi*}/I_{o*}$ of the cBN grain at a depth position of 5 μm in the normal direction to the surface of the cutting edge from the surface of the cutting edge were each determined by performing the above-described measurement method using TEM-EELS. The results are shown in Table 1.

[Cutting Test (Defect Resistance Test)]

The end mills of Sample 1 to Sample 10 were used, a carburized hardened steel (SCM415 (dimensions: 200 mm×200 mm×5 mm thickness), hardness: HRC60) was prepared as a work material, and the work material was cut under the following cutting conditions. In this cutting test, the cutting was halted at the point when the size of either a defect or a chip on the cutting edge due to the cutting of the work material exceeded 0.1 mm, and the time (units: minutes) from the start of the test to that point was evaluated. The longer this time, the better the defect resistance can be evaluated to be. The results are shown in the item "Defect Resistance (min)" in Table 1.

<Cutting Conditions>

Processing machine: Machining center

Cutting speed Vc: 100 m/min

Feed rate f: 0.05 mm/rev

Cutting amount ap: 5 mm/rev

Cutting amount ae: 0.1 mm/rev

Cutting oil (coolant): None

TABLE 1

| | Rake Face Side (ratio $I_{\pi*}/I_{o*}$) | | | | Flank Face Side (ratio $I_{\pi*}/I_{o*}$) | | | | Performance Defect |
|---|---|---|---|---|---|---|---|---|---|
| | Surface | Depth 0.2 μm | Depth 1 μm | Depth 5 μm | Surface | Depth 0.2 μm | Depth 1 μm | Depth 5 μm | Resistance (min) |
| Sample 1 | 0.005 | 0.005 | 0.005 | 0.005 | 0.9 | 0.8 | 0.2 | 0.005 | 15 |
| Sample 2 | 0.8 | 0.7 | 0.2 | 0.006 | 0.006 | 0.006 | 0.006 | 0.006 | 16 |
| Sample 3 | 1 | 0.9 | 0.2 | 0.005 | 1 | 0.9 | 0.2 | 0.005 | 19 |
| Sample 4 | 0.006 | 0.006 | 0.006 | 0.006 | 0.7 | 0.5 | 0.006 | 0.006 | 21 |

TABLE 1-continued

| | Rake Face Side (ratio $I_{\pi*}/I_{o*}$) | | | | Flank Face Side (ratio $I_{\pi*}/I_{o*}$) | | | | Performance Defect |
|---|---|---|---|---|---|---|---|---|---|
| | Surface | Depth 0.2 μm | Depth 1 μm | Depth 5 μm | Surface | Depth 0.2 μm | Depth 1 μm | Depth 5 μm | Resistance (min) |
| Sample 5 | 0.7 | 0.5 | 0.005 | 0.005 | 0.005 | 0.005 | 0.005 | 0.005 | 20 |
| Sample 6 | 0.6 | 0.4 | 0.005 | 0.005 | 0.6 | 0.4 | 0.005 | 0.005 | 28 |
| Sample 7 | 0.005 | 0.005 | 0.005 | 0.005 | 0.6 | 0.005 | 0.005 | 0.005 | 31 |
| Sample 8 | 0.7 | 0.006 | 0.006 | 0.006 | 0.006 | 0.006 | 0.006 | 0.006 | 30 |
| Sample 9 | 0.6 | 0.005 | 0.005 | 0.005 | 0.6 | 0.005 | 0.005 | 0.005 | 41 |
| Sample 10 | 0.005 | 0.005 | 0.005 | 0.005 | 0.005 | 0.005 | 0.005 | 0.005 | 10 |

[Discussion]

The end mills of Sample 1, Sample 2, Sample 4, Sample 5, Sample 7, and Sample 8 are examples in which a cubic boron nitride sintered material tool was manufactured so that as a result of the above-described fourth step, any one of the cBN grains located on the surface of any one of the rake face side and the flank face side of the cutting edge had a ratio $I_{\pi*}/I_{o*}$ of the cBN grain on the surface of the cutting edge of 0.1 to 2 and a ratio $I_{\pi*}/I_{o*}$ of the cBN grain at a depth position of 5 μm in the normal direction to the surface of the cutting edge from the surface of the cutting edge of 0.001 to 0.1. The end mills of Sample 3, Sample 6, and Sample 9 are examples in which a cubic boron nitride sintered material tool was manufactured so that as a result of the above-described fourth step, the cBN grains located on the surface of both the rake face side and the flank face side of the cutting edge had a ratio $I_{\pi*}/I_{o*}$ of the cBN grain on the surface of the cutting edge of 0.1 to 2 and a ratio $I_{\pi*}/I_{o*}$ of the cBN grain at a depth position of 5 μm in a normal direction to the surface of the cutting edge from the surface of the cutting edge of 0.001 to 0.1. The end mill of Sample 10 is an example in which a cubic boron nitride sintered material tool was manufactured by grinding using a conventional grindstone.

According to Table 1, it can be seen that the end mills of Samples 1 to 9 have improved defect resistance compared with the end mill of Sample 10. In particular, it is understood that the end mill of Sample 3 has better defect resistance than Sample 1 to Sample 2, that the end mill of Sample 6 has better defect resistance than Sample 4 to Sample 5, and that the end mill of Sample 9 has better defect resistance than Sample 7 to Sample 8. Based on these, it can be evaluated that the end mills (cubic boron nitride sintered material tools) of Sample 1 to Sample 9 have improved defect resistance compared with that obtained by the conventional method.

The embodiments and examples of the present disclosure have been described in the manner above, but it is expected from the beginning that the configurations of those embodiments and examples are to be appropriately combined or modified in various ways.

The embodiments and examples of disclosed herein are exemplary illustrations in all respects and should not be considered as being limiting. The scope of the present invention is defined by the scope of claims, and not by the above embodiments and examples, and is intended to include equivalent meanings as those of the claims and even all modifications within the scope thereof.

REFERENCE SIGNS LIST

A cubic boron nitride grain (cBN grain), 3 shank part, 8 joining part, 10 first rake face, 11 first region, 11a depth position of 0.2 μm in a normal direction to a surface of a cutting edge from the surface of the cutting edge, 12 second region, 12a depth position of 1 μm in the normal direction to the surface of the cutting edge from the surface of the cutting edge, 13 cutting edge internal region, 13a depth position of 5 μm in the normal direction to the surface of the cutting edge from the surface of the cutting edge, 15 second rake face, 20 peripheral cutting edge, 21 bottom cutting edge, 31 first flank face, 33 second flank face, 90 cutting part, 100 cubic boron nitride sintered material tool.

The invention claimed is:

1. A cubic boron nitride sintered material tool comprising a first sintered material at least on a cutting edge, wherein
the first sintered material contains a plurality of cubic boron nitride grains,
at least some cubic boron nitride grains out of the plurality of cubic boron nitride grains are located on a surface of the cutting edge,
the cubic boron nitride grains located on the surface of the cutting edge contain a cubic boron nitride phase composed of a cubic boron nitride crystal structure, and a hexagonal boron nitride phase composed of a hexagonal boron nitride crystal structure wherein
the first sintered material is a cBN sintered material including a mixture of the cubic boron nitride grains and a binding material,
a content of the cubic boron nitride grains in the first sintered material is 40% by volume or more and 95% by volume or less with respect to a total amount of the first sintered material, and
when a ratio $I_{\pi*}/I_{o*}$ between an intensity of a π* peak derived from a π bond of hexagonal boron nitride in the hexagonal boron nitride phase and an intensity of a σ* peak derived from a σ bond of hexagonal boron nitride in the hexagonal boron nitride phase and a σ bond of cubic boron nitride in the cubic boron nitride phase is determined for the cubic boron nitride grain located on the surface of the cutting edge by measuring an energy loss associated with excitation of K-shell electrons of boron by electron energy loss spectroscopy using a transmission electron microscope, the ratio $I_{\pi*}/I_{o*}$ of the cubic boron nitride grain on the surface of the cutting edge is 0.1 to 2, and the ratio $I_{\pi*}/I_{o*}$ of the cubic boron nitride grain at a depth position of 5 μm in a normal direction to the surface of the cutting edge from the surface of the cutting edge is 0.001 to 0.1.

2. The cubic boron nitride sintered material tool according to claim 1, wherein the ratio $I_{\pi*}/I_{o*}$ of the cubic boron nitride grain at a depth position of 1 μm in the normal direction to the surface of the cutting edge from the surface of the cutting edge is 0.001 to 0.1.

3. The cubic boron nitride sintered material tool according to claim 1, wherein the ratio $I_{\pi*}/I_{o*}$ of the cubic boron nitride grain at a depth position of 0.2 μm in the normal direction to the surface of the cutting edge from the surface of the cutting edge is 0.001 to 0.1.

4. The cubic boron nitride sintered material tool according to claim 1, wherein
the cubic boron nitride sintered material tool includes a rake face, a flank face, and a ridgeline where the rake face and the flank face intersect,
the rake face is continuous with the flank face via the ridgeline,
the cutting edge of the cubic boron nitride sintered material tool is constituted from a part of the rake face, a part of the flank face, and the ridgeline.

5. The cubic boron nitride sintered material tool according to claim 2, wherein the ratio $I_{\pi*}/I_{o*}$ of the cubic boron nitride grain at a depth position of 0.2 μm in the normal direction to the surface of the cutting edge from the surface of the cutting edge is 0.001 to 0.1.

6. The cubic boron nitride sintered material tool according to claim 2, wherein
the cubic boron nitride sintered material tool includes a rake face, a flank face, and a ridgeline where the rake face and the flank face intersect,
the rake face is continuous with the flank face via the ridgeline,
the cutting edge of the cubic boron nitride sintered material tool is constituted from a part of the rake face, a part of the flank face, and the ridgeline.

7. The cubic boron nitride sintered material tool according to claim 3, wherein
the cubic boron nitride sintered material tool includes a rake face, a flank face, and a ridgeline where the rake face and the flank face intersect,
the rake face is continuous with the flank face via the ridgeline,
the cutting edge of the cubic boron nitride sintered material tool is constituted from a part of the rake face, a part of the flank face, and the ridgeline.

8. The cubic boron nitride sintered material tool according to claim 5, wherein
the cubic boron nitride sintered material tool includes a rake face, a flank face, and a ridgeline where the rake face and the flank face intersect,
the rake face is continuous with the flank face via the ridgeline,
the cutting edge of the cubic boron nitride sintered material tool is constituted from a part of the rake face, a part of the flank face, and the ridgeline.

* * * * *